United States Patent
McCoy et al.

(10) Patent No.: US 8,621,507 B2
(45) Date of Patent: Dec. 31, 2013

(54) METHOD AND APPARATUS FOR IDENTIFYING AVAILABLE IPTV DEVICES ON A NETWORK

(75) Inventors: Charles McCoy, Coronado, CA (US); Ling Jun Wong, Escondido, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 164 days.

(21) Appl. No.: 13/077,783

(22) Filed: Mar. 31, 2011

(65) Prior Publication Data
US 2012/0210350 A1 Aug. 16, 2012

Related U.S. Application Data

(63) Continuation of application No. 61/442,001, filed on Feb. 11, 2011.

(51) Int. Cl.
*H04N 7/10* (2006.01)
*H04N 5/445* (2011.01)
*H04N 7/173* (2011.01)

(52) U.S. Cl.
USPC .................. 725/34; 725/46; 725/51; 725/91; 725/98

(58) Field of Classification Search
USPC .................... 725/34, 46, 51, 91, 98
See application file for complete search history.

(56) References Cited

U.S. PATENT DOCUMENTS 7,813,304 B2 * 10/2010 Salesky et al. ............... 370/260
2009/0172757 A1 * 7/2009 Aldrey et al. ................. 725/110

* cited by examiner

*Primary Examiner* — Kieu Oanh T Bui
(74) *Attorney, Agent, or Firm* — Frommer Lawrence & Haug LLP; William S. Frommer; Paul A. Levy

(57) ABSTRACT

An apparatus and a method for determining reachability of a device in a network. The method includes accessing an account from a secondary device and requesting device information of each device associated with the account. Address information of each device is obtained from the device information and a message is transmitted, to each device, requesting an indication of reachability from each device. The message is transmitted according to the address information of the device and the indication of reachability is based on device communication availability. An indication of reachability is received from each device.

18 Claims, 6 Drawing Sheets

METHOD AND APPARATUS FOR IDENTIFYING AVAILABLE IPTV DEVICES ON A NETWORK

CLAIM TO PRIORITY

This application claims the benefit of previously filed provisional application U.S. Ser. No. 61/442,001 filed Feb. 11, 2011, which is hereby incorporated by reference in its entirety herein.

BACKGROUND

1. Field of the Invention

This invention relates generally to a system and method of controlling one device capable of accessing Internet Protocol Television (IPTV) using a second device and more specifically to identifying available IPTV devices on a network.

2. Background Discussion

IPTV is capable of receiving services delivered using the architecture and networking methods of the Internet Protocol Suite as well as services delivered using a broadcasting network. IPTV services include, for example, live television, time-shifted programming, video on demand (VOD), and on-line transactions.

SUMMARY

One embodiment of the present invention is directed to a method and apparatus for discovering devices having a predetermined function in a network system. The method includes the steps of registering a first device in a management server on the network system. Then signing into the network system using a second device and receiving address information of all devices associated with a user account from the management server. Availability or ability to communicate, referred to herein as "reachability" is tested using the address information.

Another embodiment of the present invention is directed to a method for determining reachability of a device in a network. The method includes accessing an account from a secondary device and requesting device information of each device associated with the account. Address information of each device is obtained from the device information and a message is transmitted, to each device, requesting an indication of reachability from each device. The message is transmitted according to the address information of the device and the indication of reachability is based on device communication availability. An indication of reachability is received from each device.

According to another embodiment of the present invention, the method further includes the step of updating registered information of the first device periodically.

According to yet another embodiment of the present invention, the method further includes the step of updating registered information of the first device when the first device is turned on.

According to another embodiment of the present invention, the method further includes the step of requesting the address information when a communication between the first device and the second device is lost.

In one application of the present invention, a first IPTV device, which may be for example, a processing module and a second device, which may be a display device, may be used together. The second device may discover available IPTV devices such as the first device on the IPTV system without the use of broadcasting. A web application does not have the ability to use broadcast methods to scan for available devices on the network. Scanning for every IP address is possible but it takes a long time and is resource intensive. Moreover, once the IP address of an IPTV device changes, a rescan is required. Embodiments of the present invention allow the web application on the second device to identify the IPTV IP address, instead of searching an entire network.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
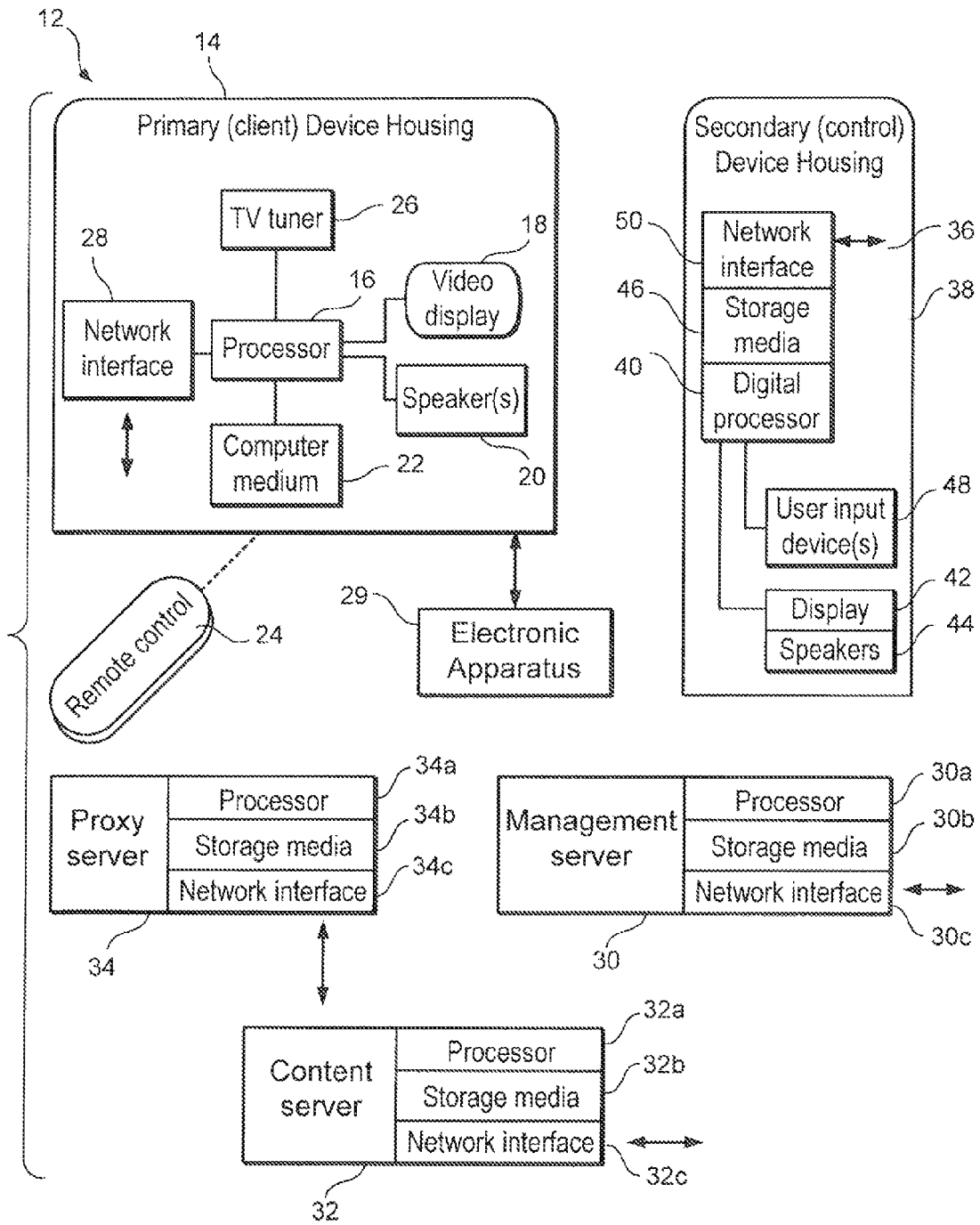
FIG. 1 shows a block diagram of one embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules or processing facilities. The processing devices, or modules, or facilities, may be coupled such that portions of the processing and/or data manipulation may be performed at one or more processing devices and shared or transmitted between a plurality of processing devices.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user to manipulate (e.g., browsing, searching, displaying, pausing, playback, or other operation) content on a second device to have their selection played by a first device. The user can then continue to browse the content on any number of second devices without interrupting the content that is playing on the first device. The first device may be an IPTV. The second device may be another electronic device. The method include an architecture design and implementation that allows a user to navigate, browse, and search content on a second device that may be a consumer electronic device such as a Sony Ericsson® smart phone, VAIO® PC, VAIO® laptop, Mylo®, personal computer, or other apparatus with sufficient processing and storage capability, or any device with a web browser. Concurrently, while a user is using the first device, another user can perform these activities on the second device and send a media selection to the first device of the user's choice for playback.

A second device, also referred to as a secondary device and/or a secondary display device, which may or may not have an associated display unit, performs manipulation functions such as searching, content playback, pause, browsing (when operable with a web browsing application) and may also act as a visual aid to the IPTV device, but does not require additional investments by the user because it makes use of a device (such as a cellphone, laptop, etc) which most users would typically already have in their possession. The second device executes a program that allows the second device to act as the visual aid. A second device that has a pointing device, such as a mouse or touch screen, or track ball, creates a more natural user interface for searching and browsing than a user interface on an IPTV device that does not have a pointing device. It is a low cost solution which opens up a huge window of business and technical opportunities. It is a favorable complement to the use of one or more IPTV devices because the secondary device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in any suitable language, such as Java-Script, HTML, or other language with the desired or necessary functionality, which can be loaded by any device with a browser, or an application written in languages which may not be run in a web browser, such as C, C++, Java, etc., hence not limited to only a small set of compatible devices.

An IPTV system typically includes an IPTV device and IPTV client processor for controlling a video display to present content thereon. The system also includes a second device including a control processor and a management server communicating with the IPTV client over the Internet. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token that may subsequently be presented by the IPTV client to a the content server to obtain content from the content server. The management server receives and stores a local IP address of the IPTV client, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of a content so that unauthorized distributions of content are effectively prevented.

According to an embodiment of the present invention, a consumer electronic device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics has a unique identifier that, without other means, is able to identify the client consumer electronics within the IPTV system. The unique identifier may be assigned by a manufacturer or assigned by the management server when the client consumer electronics is registered in the IPTV system.

To undertake present principles, the processor 16 may access one or more computer readable storage media 22 such as but not limited to RAM-based storage (e.g., a chip implementing dynamic random access memory (DRAM) or flash memory or disk-based-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30*a*, 32*a*, 34*a* accessing respective nontransitory computer readable storage media 30*b*, 32*b*, 34*b* which may be, without limitation, disk-based and/or solid state storage. The servers communicate with a wide area network such as the Internet via respective network interfaces 30*c*, 32*c*, and 34*c*. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals. The electronic device may be a digital video recorder, a Blu-ray player, a game player, an audio amplifier, or an air conditioner. Storage may be any suitable electronic storage, such as RAM, ROM, EEPROM, or other storage medium, or cloud-based storage using local or remote storage via a network, such as storage at a remote server.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2A:
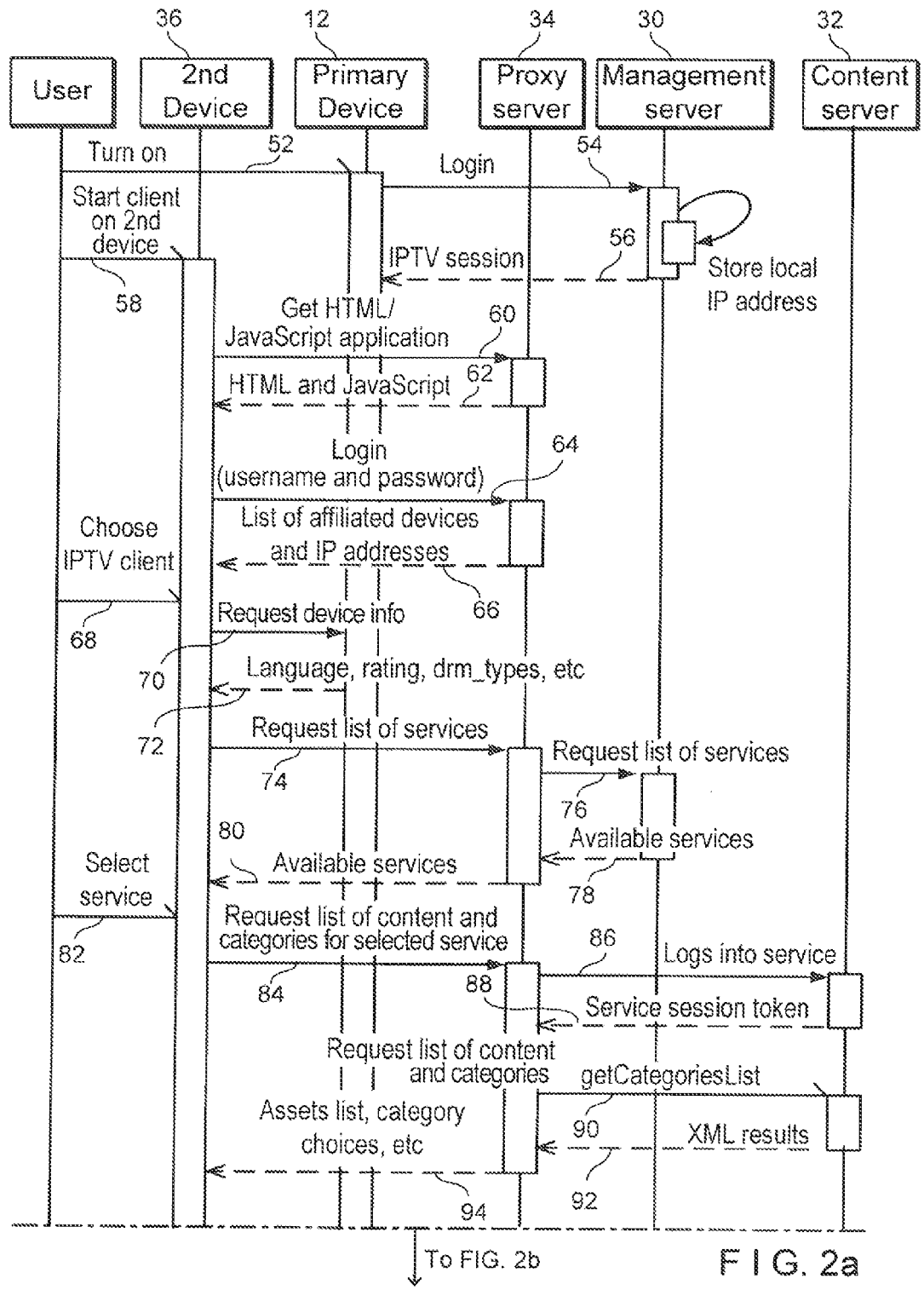
FIG. 2 shows a series of steps according to an embodiment of the present invention.
Figure 2B:
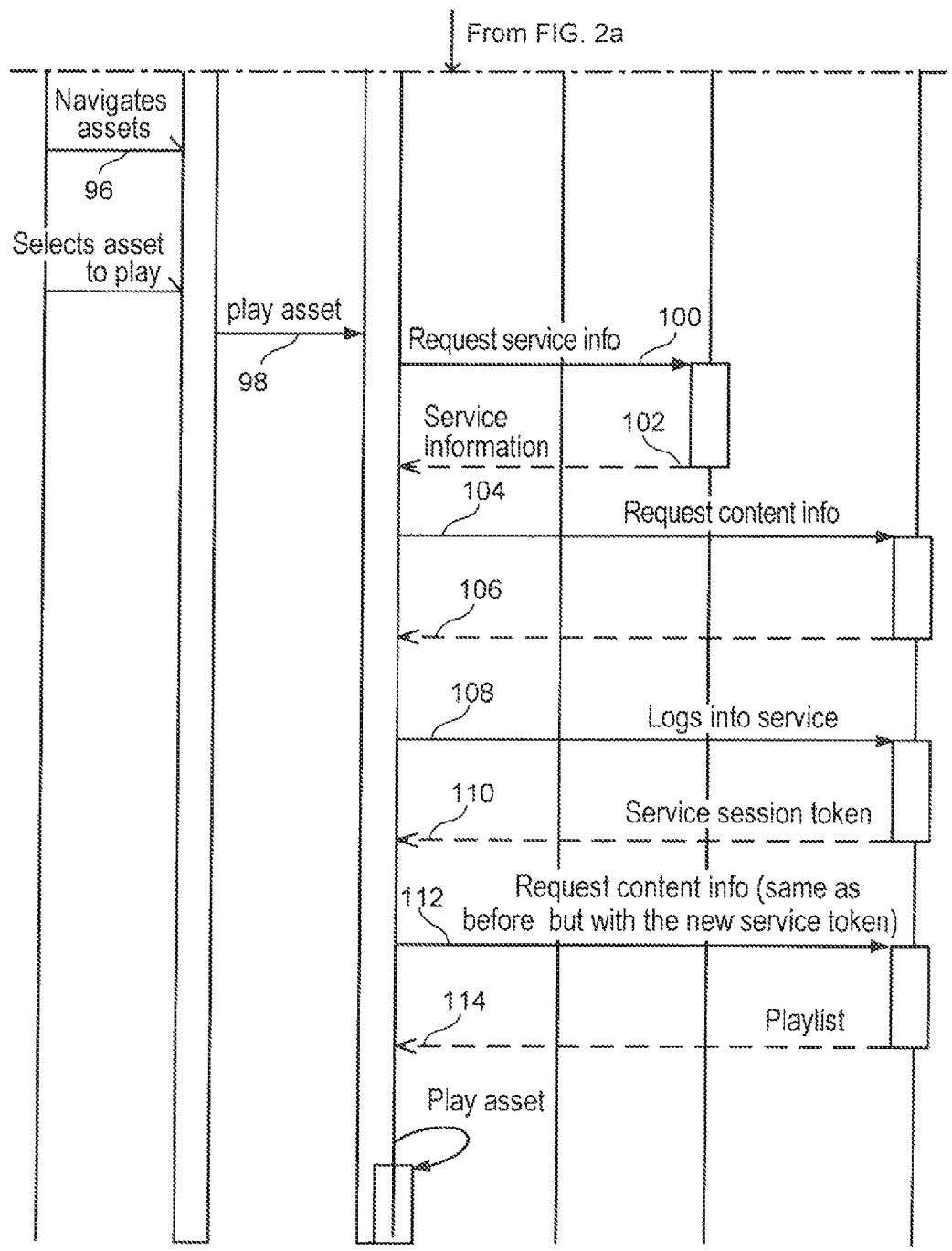

FIG. 2 shows an example embodiment of present principles for enabling a user to use a second device 36 to browse assets and select one to have a first device 12 such as a main IPTV client play the content (IPTV client is also referred to as an IPTV client device and/or an IPTV device and/or IPTV). FIG. 2 assumes that the user has already created an account with the management server 30 and has affiliated the main IPTV device with that account. In general, a user loads the web application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local IP location (IP address or IP address and port number) of the IPTV client device 12.

At state 58, the user instantiates an IPTV client control utility on the second device 36. The utility executed on the second device 36, at state 60, sends a request to the proxy server 34, which returns (62) a response to the request in a suitable language, such as hypertext markup language (HTML) with JavaScript, for the second device 36 to execute in accordance with description below. This JavaScript makes asynchronous JavaScript and extended markup language (XML) (AJAX) calls, or other suitable language or protocol, depending on the implementation, to the proxy server and to the IPTV client to obtain information to control the IPTV client. It is noted that state 60 is only needed in implementations that use a downloadable HTML application for the second display software. The behavior of the JavaScript applies to implementations that are built using JavaScript. In another embodiment, step 60 may not be necessary where other client application implementations are used, such as one where the client application is not downloaded each time it is used. It should also be noted that other technologies (e.g. C, C++, Perl, and Flash) can be used for the implementation of the client application and that neither HTML nor JavaScript are required.

With more specificity, at state 64 using the JavaScript (or other suitable language) received from the proxy server 34 the second device 36 prompts the user to input to the second device 36 the account login information, including, e.g., the same user name and password that the IPTV client provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account, including their local IP addresses which were stored by the management server 30 after login at 54 (and subsequently provided to the proxy server 34).

When the user inputs to the second device 36 at state 68 a selected IPTV client (in this example, the IPTV client 12) to use with the second device, the second device 36, using the local IP address returned at state 66, accesses the IPTV client device 12 directly. The second device 36 requests device information about the IPTV client device 12 at state 70, including language information, rating information, digital rights management (DRM) information, etc. as desired, which information is returned from the IPTV client 12 to the second device 36 at state 72. Since the second device 36 knows the IP address of the IPTV client 12 and consequently communicates directly with the IPTV client 12, the second device 36 communicates using a local web address of the IPTV client 12 that need not be globally addressable, and may so communicate as long as the second device 36 and IPTV client 12 are on the same local network. It is noted that in state 70, the communication from the second device to the primary device may go through an external server in some implementations, which will allow the system to operate in environments where the primary device is not reachable by the second device due to the network configuration.

At state 74 the second device 36 sends the client information received at state 72 to the proxy server 34, requesting a list of services available to the IPTV client 12 from one or more of the content servers 32. The proxy server 34 relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories and options to the proxy server 34 along with a service session token that the second device may have received from the content server 32 via the management server 30.

Responsive to the request, at state 86 the proxy server logs into the service at state 86 of the content server 32 providing the selected service. At state 88 the content server 32 provides to the proxy server 34 a service session token for the particular content server 34. State 90 indicates that if desired the proxy server 34 may also request a list of content and categories of the content server 32, and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client device 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony Infrared Remote Control System® (SIRCS) protocol. The second device may transmit command signals to the IPTV client to control the electronic device 29.

As shown in FIG. 2, if desired, temporally between states 102 and 116 a series of messages may be exchanged between the IPTV client 12 and the content server 32. For example, a request for content information may be made (104) by the IPTV client 12 and returned (106) by the content server 32. The above-described logging into the service may be relayed by the IPTV client device 12 to the content server 32 at state 108 and a service session token is returned to the IPTV client at state 110 along with the before-mentioned asset information. Also, a request of content information may be made (112) and a playlist returned to (114) the IPTV client device 12.

The JavaScript/HTML software or an application written in languages which may not be run in a web browser, such as C, C++, Java, etc., that is downloaded at state 62 can be make available to all electronic vendors who wish their users to be able to navigate, browse, and search IPTV content on a second device.

The following situations illustrate some scenarios where the second device complements the IPTV's shortcomings, hence providing better user experience for the IPTV user. For example, a group of friends is watching video clips on an IPTV. Each of them are browsing content on their own second display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a second display to select a movie for them to watch when the game ends. In another example, a user may be away from an IPTV, but the user may use a smart phone as the second device to browse contents and select a preferable content to be play on the IPTV.

In the above-identified situations, using a second device can provide many benefits, such as:
  Browsing in own language without disturbing the big screen
  Ease of data entry in a language not supported by the IPTV
  On-device service affiliation for premium services like Netflix
  Cross-device playback and resume from a recently viewed list
  Social sharing of content to enhance content proliferation
  Management of subscription-based services from a single location
  Browsing and queue management on the move
  One-click Customer service without the need of entering personal or device information
  Quick access to relevant device specifications and manuals
  Hyper-linked text in forms directs users to informational sites
  Content Queue across devices
  Advertisement revenue through Second display usage The second device provides an enhanced user experience of the IPTV without adding to the hardware costs of the unit, thus making data entry easy and allows users to browse content on the side. IPTV is also a global solution which connects various IPTVs together in a cohesive manner through its potential of initiating playback across devices and also provides the highest level of customer service to users through its one-click customer service feature, where users do not even need to provide any device information which can be difficult to retrieve in the event of a device breakdown.

Figure 3:
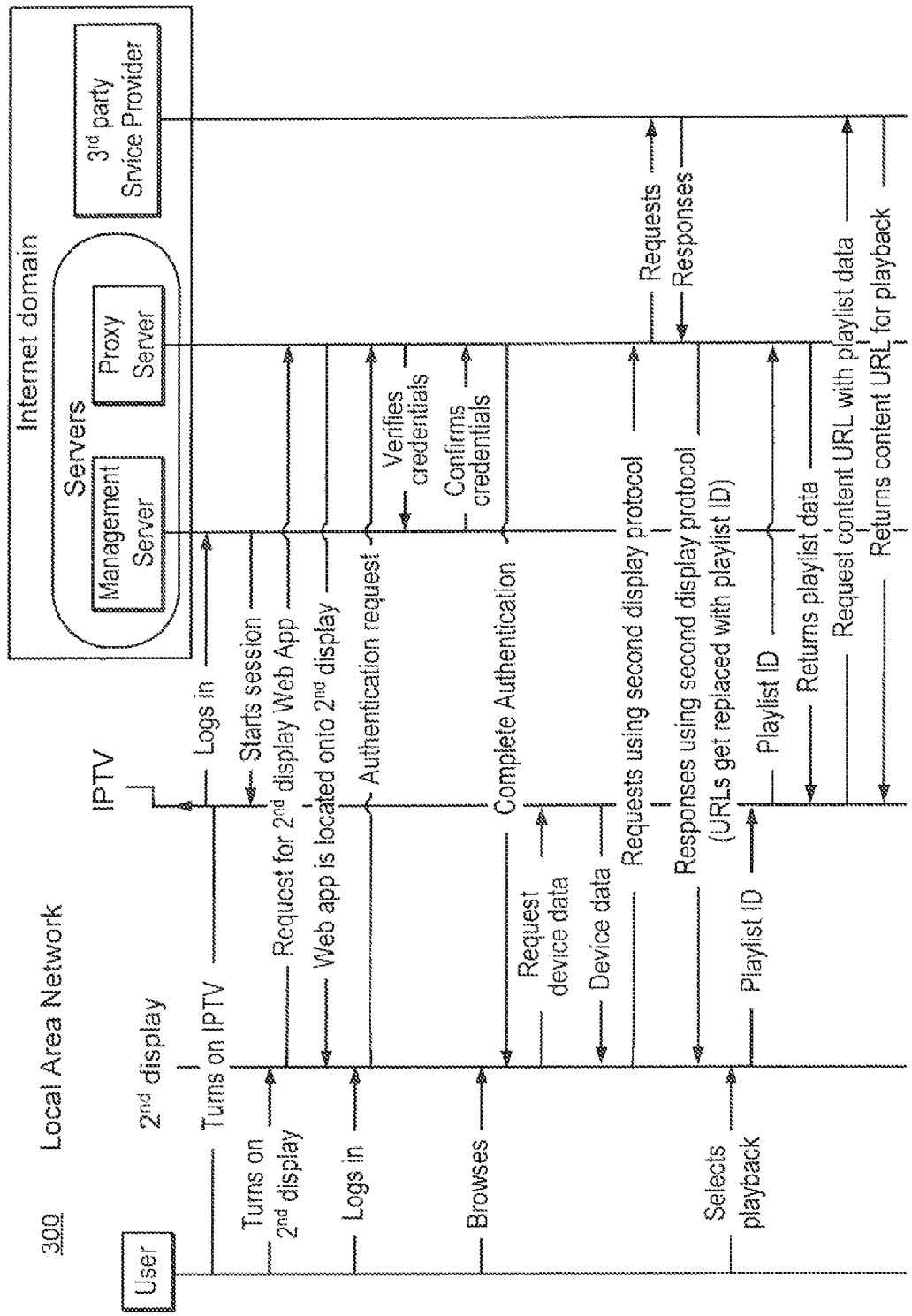
FIG. 3 shows a schematic representation of an embodiment of the present invention.

FIG. 3 shows a schematic representation 300 of an embodiment in which the present invention finds ready application. First a user turns on an IPTV client. After the user logs in on IPTV into the management server using device credential, a session is started. Then the user turns on the second display device, and requests for a second display application to proxy server (this can be a remote or local server). The second display application (native/interpreted application) is loaded onto the second display. Then the user logs into the application using account information, the account information is the same account used for IPTV to log in as described above (however, this is not the same account credential). An authentication request is sent from the second display to the proxy server. The proxy server verifies credentials with the management server, and then the management server confirms credentials with the proxy server. So that authentication is completed.

Then the user browses an Internet video link (IVL). After that, the device data is requested from the second display and then the requested device data is sent from IPTV client to the second display. The second display sends a request using second display protocol to the proxy server, and then the proxy server requests to service provider, and the service provider responds. The proxy server responds using a second display protocol to the second display with the associated URL replaced with playlist ID.

After the user selects playback, the playlist ID is sent from the second display to the IPTV client. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client. When the IPTV client device is not reachable, the playlist ID is not received and the second display device notifies the user that the IPTV client device is not reachable. The second display device stores the Playlist ID for a later attempt at sending to the IPTV client device. In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
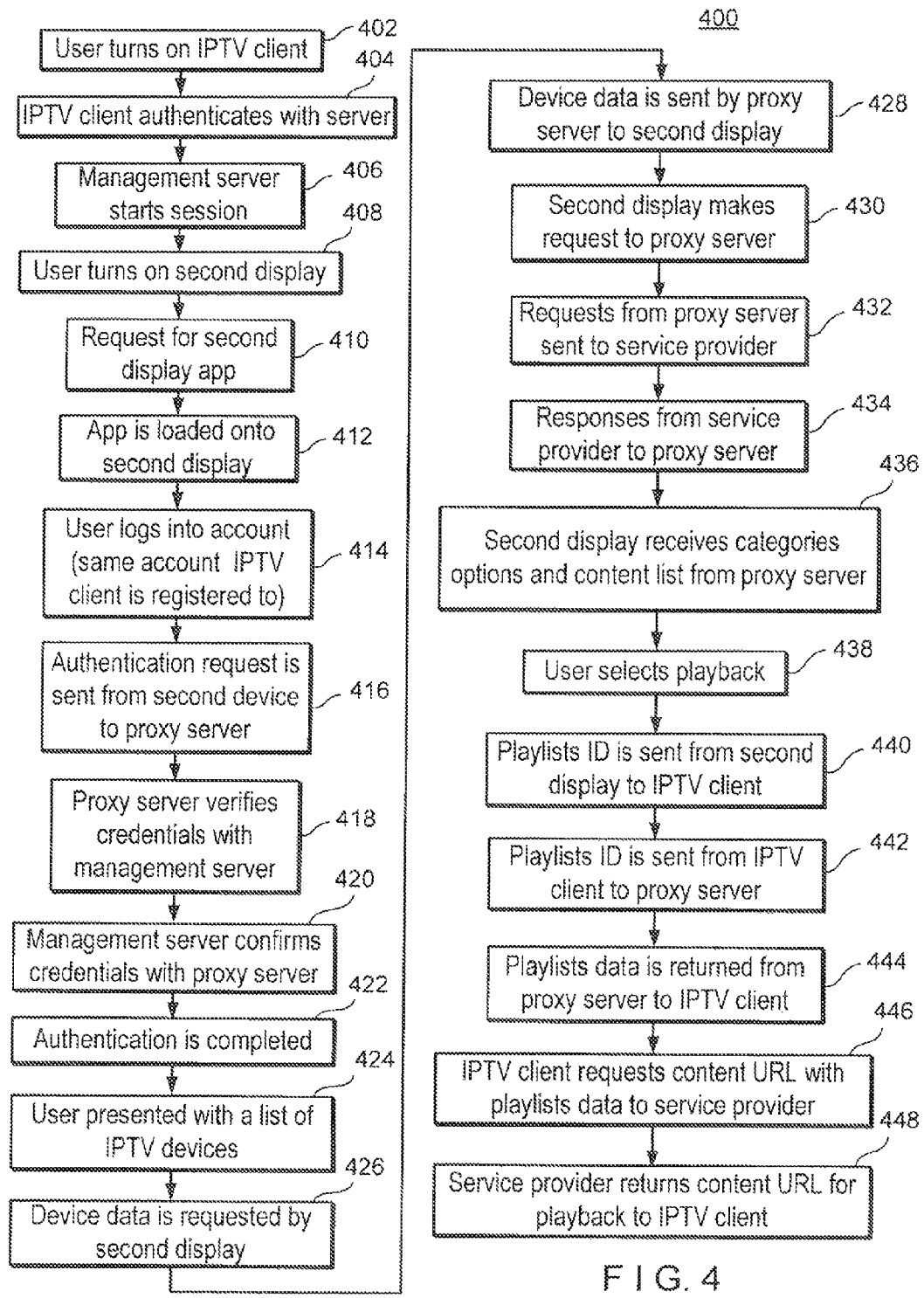
FIG. 4 shows a flow chart of processing steps according to an embodiment of the present invention.

FIG. 4 shows a flow chart 400 of processing steps according to the embodiment of FIG. 3.

The process begins in step 402 in which the user turns on an IPTV client device. After the IPTV client device is authenticated with the server, as shown in step 404, the management server starts the session in step 406. Then in step 408 the user turns on the second display, and sends a request for a second display application to a proxy server, which may be a local server or remote server, as shown in step 410. The request for the second display application is optional. In some embodiments of the present invention, the second display will receive the second display application every time the application is started, while it is also an embodiment of the present invention that the second display device will not receive the second display application or only on a software update. When requested, the second display application is loaded onto the second display, as shown in step 412. In step 414 the user logs into the account, which is the account used for the IPTV client to log in as described in step 404. In step 416 an authentication request is sent from the second display to the proxy server. The proxy server could be a local server or a remote server. In step 418 the proxy server verifies the credentials of the IPTV client with the management server, and then in step 420 the management server confirms the credentials with the proxy server. In step 422, authentication is completed. It is an embodiment of the present invention that the server in steps 418 and 420 may be in the same server. Alternatively, there may be more than two servers splitting the server tasks.

In step 424 the user is presented with a list of IPV devices affiliated, or associated with, the secondary display device via the user account. In step 426, when a user selects a particular IPTV device to communicate with, an application program interface (API) call is sent to the selected IPTV device, device data, describing the second display, is requested by the second display and in step 428 the requested device data is sent from the IPTV client to the second display, this information may include information specific to the IPTV device such as content rating permitted by that device, language, etc. In an embodiment in which the user has already selected an IPTV device in a previous session, an API may be sent to that IPTV device to obtain device information without the user making a request. Also, according to an embodiment of the present invention, the user may set a particular IPTV device as the default device in a list of IPTV devices. In step 430 the second display makes requests using a second display API to the proxy server for options, categories and content list, and then in step 432 the proxy server in turn requests them from the service provider and the service provider responds with options, categories and content list, as shown in step 434. In step 436 the second display receives categories, options and content list from the proxy server and displays them for the user. Alternatively, the service provider may permit, in some cases, that the URL is sent to the second display device. For example, the second display may have a secure application, and the service provider may allow a second display with a secure application to receive the URL. Thus, the content URL may be transmitted to the IPTV device for playback, rather than having the IPTV device retrieve the data from the server. Alternatively, the service provider may permit, in some cases, that the URL be sent to the second display device. For example, the second display may have a secure application, and the service provider may allow a second display device with a secure application to receive the URL. Thus, the content URL may be transmitted to the IPTV device for playback, rather than having the IPTV device retrieve the data from the server.

In step 438 in which the user selects content for playback and a playlist is created for that content and stored in the proxy server. Then in step 440 a playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to proxy server, and returned from proxy server to IPTV client in step 444. In step 446 IPTV client requests content URL with playlist data to service provider, and then in step 448 the service provider returns content URL for playback to the IPTV client. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

According to an embodiment of the present invention, the second device may discover available IPTV devices such as the first device on the IPTV system without the use of broadcasting. A web application does not have the ability to use broadcast methods to scan for available devices on the network. Scanning for every IP address is possible but it takes a long time and is resource intensive. Moreover, once the IP address of an IPTV device changes, a rescan is required. Embodiments of the present invention allow the web application on the second device to identify the IPTV IP address.

When the first device is registered in the IPTV system, information of the first device is stored in the management server. The stored information includes the unique identifier of the first device, the local IP address, an account number associated with the first device, and features of the first device. An account as identified by the account number may be associated with a plurality of IPTV devices. The account may also include a list of entitled services or options provided by the IPTV system. The first device may update the stored information periodically and update the stored information when the IP address of the first device is changed.

When a second device is logged in to the IPTV system using an account, information of all the IPTV devices associated with the same account may be retrieved and transmitted from the management server to the second device. The transmitted information may include unique identifiers of IPTV devices, local IP addresses of IPTV devices, features of each IPTV device and etc.

The second device receives the information and uses a computer administration network utility to test the availability or accessibility or reachability of each associated IPTV device using the local IP address included in the transmitted information.

A computer network administration utility, such as an API call may be used. Alternatively, a ping may be used to test the availability or "reachability" or available to communicate, or accessible for communication, of a device on a network such as an Internet Protocol (IP) network and measures the round-trip time for messages between the two devices on the network. The ping operates by sending Internet Control Message Protocol (ICMP) echo request packets to the target and waiting for an ICMP response. In the process it measures the time from transmission to reception (round-trip time) and records any packet loss. The results of the test are in a form of a statistical summary of the response packets received, including the minimum, maximum, and the mean round-trip times, and sometimes the standard deviation of the mean. Ping may be run using various options (command line switches) depending on the implementation that enable special operational modes, such as to specify the packet size used as the probe, automatic repeated operation for sending a specified count of probes, time stamping options, or to perform a ping flood. The computer network administration utility need not be limited to ping. Other functions that test the reachability of a device may act as a computer network administration utility. Another method may have the second device attempt to contact a target device using the same protocol (such as HTTP) and same port that the second device may use to communicate with the target device. In a situation that some networks may block some ports or protocols from being used, this method ensures that an allowed combination of protocol and port number that is used for communication to the target device will get through.

Active IPTV devices are identified based on the responses to the requests that are presented to one or more IPTV devices on the network. The first device may be, for example, a processing device having a display module or display unit and the second device may be a display screen, or display module. Typically a first device, which may be an IPTV device will receive an API and, if the IPTV device is operational, respond to the API. The API may be transmitted from a second device, an IPTV device or other device coupled to the network. When the response to the API request indicates that an IPTV device is offline, the features of the offline IPTV devices may be turned off and be unavailable to the second device. Using the IP addresses of active IPTV devices, the second device communicates with active IPTV devices. Communication includes retrieving the IPTV device's current status and ordering a playback. When the second device maintains communication with the IPTV device, the second device may update the IP address of the IPTV device periodically from the management server. When the second device loses communication with the IPTV device, the second device transmits a request to the management server to obtain updated information of the IPTV device or all associated IPTV devices. If the updated information shows the same IP address as the previous information, the second device determines that the IPTV device is down or non-operational or unavailable. When this happens, the IPTV device status on the second device will be switched to "offline" and certain features are disabled. In this way, the traditional broadcast method is circumvented and polling every single possible IP address blindly is avoided.

Figure 5:
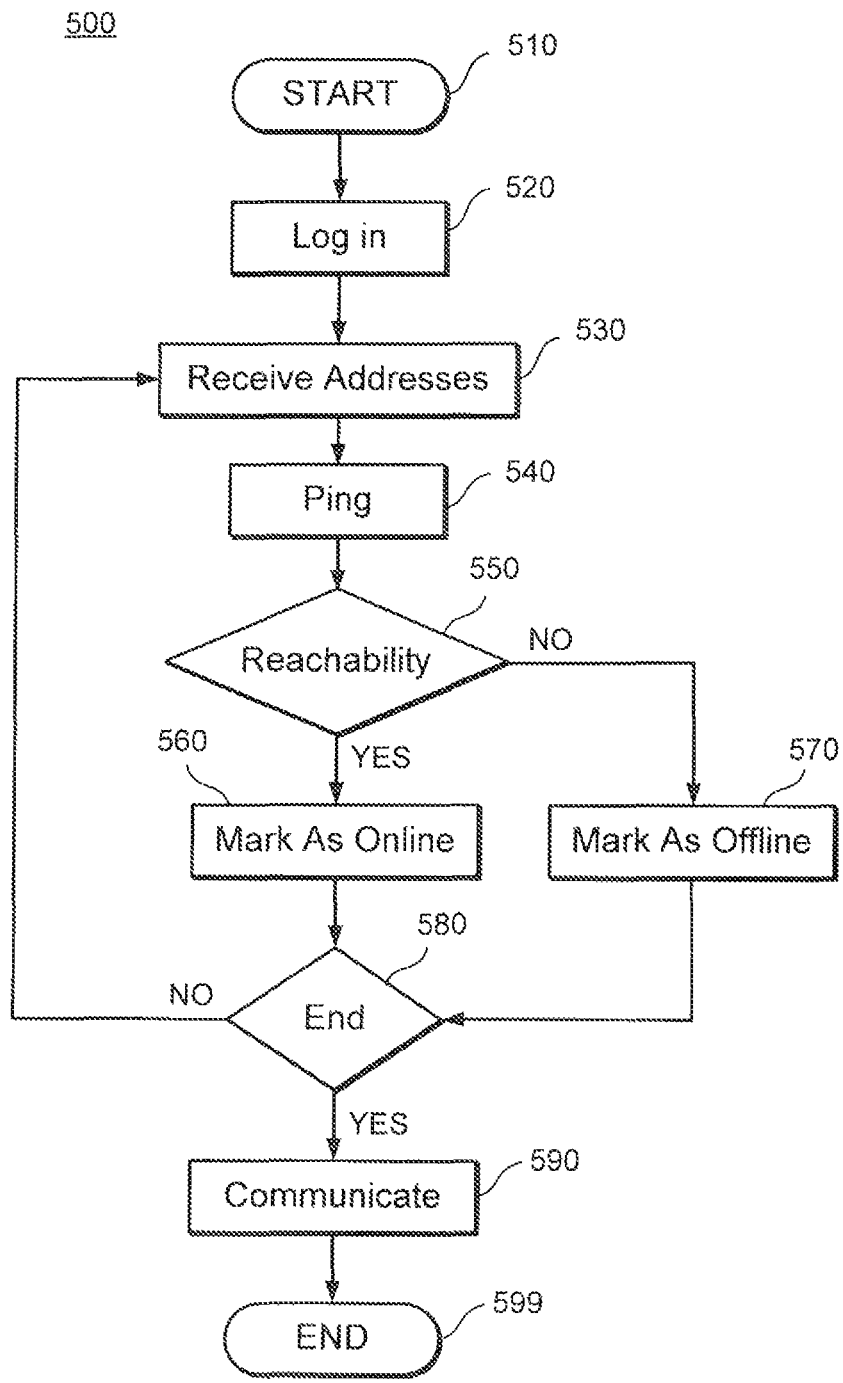
FIG. 5 shows a series of steps according to an embodiment of the present invention.

FIG. 5 illustrates a flow chart 500 showing the discovery process of an IPTV device.

The discovery process starts at step 510 when the secondary device, or second device, is turned on. When a user prefers to implement an IPTV function, the user logs in to a client account at step 520. After verifying the credentials input by the user, the management server retrieves information of IPTV devices associated with the user's account and transmits the information to the second device through the proxy server. The second device receives the information at step 530 and stores the received information in a device memory. This information may also be updated. The second device also obtains IP addresses of the IPTV devices included in the received information. The second device implements a call function, such as an API (application program interface, or unicast) to test the reachability of IPTV devices associated with those IP addresses. The process then proceeds to step 550, which shows that second device determines whether a response to the call function indicates a reachable device or not. If the second device determines that the response indicates an IPTV device is reachable, the process proceeds to step 560, which shows that the second device flags the IPTV device as "online". If the second device determines that the response indicates an IPTV device is not reachable, the process proceeds to step 570 which shows that the second device flags the IPTV device as "offline" and turns off features corresponding to that IPTV device. These features include functions such as record, pause, playback and other operational features of the IPTV device. The process then proceeds to step 580, which shows that the second device determines whether each IP address of the IPTV devices associated with the user's account has been tested. If an IP address is not tested, the process returns to step 540. If every IP address of the IPTV devices associated with the user's account has been tested, the second device communicates, as shown in step 590 with every "online" IPTV devices to request a device status or order a playback according to the user's instructions. The process then proceeds to communication step 590, which may transmit the discovery results to the proxy server and the management server. The process ends at step 599.

As shown in process step 540, the call function, such as an API call, or unicast may send out the reachability test sequentially or substantially in parallel. When the call sends out the reachability test sequentially, a waiting period for receiving a response is established for each test. To shorten the total waiting period, the call function may send a predetermined number of reachability tests simultaneously. As each of the results is returned, the process illustrated at step 550, 560, and 570 is applied to the tested device. The process then proceeds to step 580, which determines whether any outstanding request is still pending. If step 580 determines that no outstanding request is pending, the process proceeds to step 590. If step 580 determines that outstanding requests are stilling pending, the process returns to step 540, which shows that the process may continue to monitor the outstanding requests or instruct the call function to start another test for the IPTV devices associated with the outstanding requests. In this way, the user may only need to wait for a much shorter timeout interval to know reachablities of the tested IPTV devices.

The second device, also referred to as a secondary device herein, may request the IP addresses stored in the management server again when the communication between the second device and the first device is lost or no longer maintained for a predetermined period of time. The second device compares the newly received IP addresses with the previously received IP addresses. If the addresses are the same, the second device determines that the first device is "offline". If the addresses are different, the second device tests the reachability of the IPTV device associated with the new IP address, typically by an API call to the new address, or location, which may be a uniform resource locator (URL) or uniform resource identifier (URI). The process then proceeds to communication step 590, which may transmit the discovery results to the proxy server and the management server.

The information stored in the management server is updated so as to be accurate. Updating the information is conducted periodically by the first device and the second device such as every hour or every day, or other desired or determined time period. Other events may also trigger an update of the information. For example, when the first device or the second device is turned on, the availability, or reachability information is updated. When the first device or the second device changes its IP address, the availability or reachability information is updated. When the second device detects that a first device is offline, the "offline" status is transmitted to the management server to update the information.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for determining reachability of a device from a user device in a network, comprising the steps of:
    accessing a user's account on a server though a secondary device;
    requesting device information of each device associated with the user's account on the server;
    obtaining address information of each device from the device information;
    transmitting a message, to each device, requesting an indication of reachability from each device, the message being transmitted according to the address information of the device,
    wherein the indication of reachability is based on device communication availability; and
    receiving an indication of reachablity from each device, the indication of reachability includes a list of content assets associated with each device,
    wherein functions of a reachable device associated with the user's account are controllable by the user device, and
    wherein when the list of content assets is received, a Universal Resource Locator (URL) associated with each asset is removed and a reference ID is added to the list for each asset.

2. The method according to claim 1, wherein the address comprises an electronic address.

3. The method according to claim 1, wherein the address comprises a uniform resource identifier (URI).

4. The method according to claim 1, wherein the address comprises a uniform resource locator (URL).

5. The method according to claim 1, wherein the address comprises network contact information.

6. The method according to claim 1, further comprising the step of requesting status information from each device.

7. The method according to claim 6, wherein the status information includes information related to content that a device is playing or recording.

8. The method according to claim 1, further comprising the step of transmitting a command to playback a program to a reachable device from the secondary device.

9. The method according to claim 1, further comprising the step of transmitting device reachability results to a service provider.

10. The method according to claim 1, wherein when a device that provided an indication of reachability becomes unreachable, the secondary device requests updated device information from a service provider.

11. The method according to claim 1, where when a device is not reachable, functions of the unreachable device are prevented from being accessible by the secondary device.

12. The method according to claim 1, wherein the secondary device is a portable device.

13. The method according to claim 1, wherein the network includes an IPTV network.

14. The method according to claim 1, wherein an unreachable device transmits a list of capable function of the unreachable device to the server.

15. The method according to claim 1, wherein the transmitting step further includes the step of making a call to each device by using an applied program interface, wherein the call includes a port number of each device.

16. The method according to claim 15, wherein the indication of reachability indicates that a call is received and that the device is not available.

17. The method according to claim 15, wherein the indication of reachability indicates that the device is not available currently and will be available later.

18. A method for identifying reachability of a device from a user device in a network, comprising the steps of:

receiving a request for device information of each device associated with a user's account;

providing, to a secondary device, address information of each device associated with the user's account;

transmitting a message requesting an indication of reachability to each device according to the device address information; and receiving an indication of reachability from each device, indicating device communication availability, indication of reachability including a list of content assets associated with each device, wherein functions of a reachable device associated with the user's account are controllable by the user device, and wherein when the list of content assets is received, a Universal Resource Locator (URL) associated with each asset is removed and a reference ID is added to the list for each asset.

\* \* \* \* \*